Patented Mar. 24, 1925.

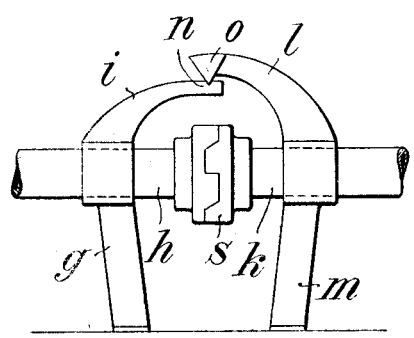
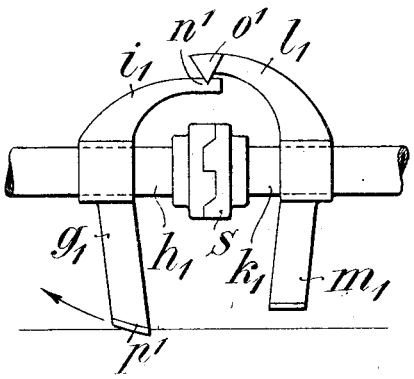
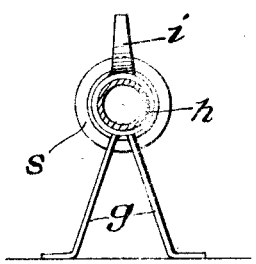

1,531,106

UNITED STATES PATENT OFFICE.

WALTER KRAUSE, OF FRIESACK, GERMANY.

IRRIGATION SYSTEM.

Application filed May 20, 1920. Serial No. 383,020.

*To all whom it may concern:*

Be it known that I, WALTER KRAUSE, a citizen of Germany, and resident of Friesack, Mark, Germany, have invented certain new and useful Improvements in Irrigation Systems (for which I have filed applications in Germany, August 13, 1917; Austria, January 29, 1919, Patent No. 85,055; Hungary, February 1, 1919; France, February 11, 1919, Patent No. 517,859; Spain, February 27, 1919, Patent No. 69,176; Denmark, February 4, 1919, Patent No. 27,076; Belgium, February 24, 1919, Patent No. 279,058; Netherlands, March 10, 1919; Italy, February 25, 1919, Patent No. 97/542; Luxemburg, October 4, 1919, Patent No. 11,525; Roumania, October 7, 1919, Patent No. 5,058; Sweden, January 31, 1919; Canada, May 26, 1920, Patent No. 220,938; Great Britain, January 27, 1920, Patent No. 138,343; Poland, July 5, 1920; Czechoslovakia, June 18, 1920; Argentine Republic, August 3, 1920), of which the following is a specification.

My invention relates to improvements in irrigation systems, and more particularly in irrigation systems of that class in which the water is supplied to sprinkling devices through conduits which consist of a plurality of sectional pipes carrying the sprinkling devices and adapted to be connected by joints permitting of a ready assembling and disconnecting of the pipes for carrying the same from one point of use to another one. Such pipe sections are ordinarily made as long as possible in order to reduce the work connected with assembling the conduit, and for the same reason supporting members or legs are connected therewith, an attendant being able to carry the sections and their supporting members to the point of use. In constructions now in use it is difficult or almost impossible to place a pipe section with its supporting members on the ground in the proper position for being jointed to a section which has before been brought into position without shifting the same over the field, which is objectionable because thereby the plants are injured. The object of the improvements is to provide a construction whereby the sections can directly be placed on the ground in the proper position relatively to the other sections, so that much time is saved in assembling the conduits, and all the sections can be placed in the proper positions whereupon all the joints are made, which greatly reduces the amount of walking required of the attendant. With this and other objects in view my invention consists in the matters to be described hereinafter and particularly pointed out in the appended claims. For the purpose of explaining the invention two examples embodying the same have been shown in the accompanying drawing, in which Figs. 1 and 2 are side views of the said examples, and Fig. 3 is an end view of the construction shown in Fig. 1, partly in section.

In Figs. 1 and 2 I have shown the ends of two pipes forming a part of the sprinkling conduit. But I wish it to be understood that my invention is not limited to the use in a sprinkling apparatus. As shown in Fig. 1 the sprinkling pipes $h$ and $k$ are supported on and rotatable in supporting members or legs $g$ and $m$, and from the said legs bent arms $i$ and $l$ project upwards which are formed at their ends respectively with a notch $n$ and a tooth $o$ adapted for engagement with each other. When the arm $l$ is set on the arm $i$ with the notch $n$ and tooth $o$ in engagement with each other the pipes $h$ and $k$ are located the proper distance apart, whereupon the joint $s$ can be made, which as shown is in the form of a claw coupling. With a coupling of the character illustrated, rotation of one of the pipes in its supporting member, relatively to the other pipe, in the proper direction, will tend to open the joint by a sort of cam action and thus facilitate separation of the pipes when desired. Relative rotation of the pipes in the opposite direction will not affect the tightness of the joint. However, if the ground on which the members $g$ and $m$ are supported is not level, and also in some cases when disconnecting the joint, there arise certain difficulties which are avoided in the construction shown in Fig. 2.

In this construction the pipe $h_1$ is equipped with a supporting member $g_1$ which is longer than the supporting member $m_1$ of the pipe $k_1$ so that the member $m_1$ does not rest on the ground when the arm $l_1$ bears on the arm $i_1$. In order to have the member $m_1$ rest on the ground, the member $i_1$ is rocked away from the arm $l_1$ in the direction of the arrow shown in Fig. 2 and about the notch $n_1$ while being engaged by the tooth $o_1$ of member $l_1$. For more easily rocking the member $g_1$ I prefer to provide the same with a rounded foot portion $p_1$.

Fig. 3 shows that the leg $g$ of Fig. 1 is forked, its two diverging members being located in substantially the same transverse plane, so as to afford a firm footing and prevent the pipe line from falling to one side or the other. The same forked construction is preferably adopted for the legs $m$ (Fig. 1) or $g_1$, $m_1$ (Fig. 2), the illustration in Fig. 3 being thought sufficient to make this clear.

By providing spacing members of the constructions referred to the attendant is enabled to first carry all the sectional pipes into their proper positions and thereafter to make all the joints while walking from one to the other once. Thereby the length of the way to be traveled by the attendant is reduced.

From the foregoing description of the invention the method of assembling the conduits will readily be understood. Preferably the attendant first carries all the pipes $h$, $k$, etc. with their legs $g$, $m$, etc. to the desired place, and when setting a pipe on the ground he hangs the pipe $k$ with its arm $l$, or $l_1$ on the arm $i$, or $i_1$ respectively, whereupon the pipe ends are in their proper positions. Therefore it is not necessary to shift the same over the ground, which would injure the plants, and would also require the attendant to look after the joints. After all the pipes have been brought to their respective positions the attendant walks along the conduit and makes the joints.

I claim:

1. In an irrigation system a conduit composed of sectional pipes, joints for said pipes, supporting members connected with each of said pipes, so that each of them will have its individual support, and spacing members connected with the pipes and adapted for engagement with each other when the pipe ends are in their proper relative positions.

2. In an irrigation system, a conduit composed of sectional pipes, joints for said pipes, supporting members connected with each of said pipes, so that each of them will have its individual support, and spacing arms connected with the pipes and formed respectively with a notch and a tooth adapted for engagement with each other when the pipe ends are in their proper relative positions.

3. In an irrigation system, a conduit composed of sectional pipes, joints for said pipes, supporting members of different heights connected with said pipes, and spacing members connected with the pipes and adapted for engagement with each other when the pipe ends are in their proper relative positions.

4. In an irrigation system, a conduit composed of sectional pipes provided with mating joints of cam formation to cause the pipes to move apart when rotated relatively to each other in a certain direction, supporting members in which said pipes are mounted rotatably, and spacing members, in mutual engagement, connected with said pipes.

In testimony whereof I hereunto affix my signature in the presence of two witnesses.

WALTER KRAUSE.

Witnesses:
GRETE GUTZLIT,
GERTRUD FÄHNRICH.